(12) United States Patent
He

(10) Patent No.: US 8,495,394 B2
(45) Date of Patent: Jul. 23, 2013

(54) TIMING CONTROL CIRCUIT AND POWER SUPPLY USING THE SAME

(75) Inventor: Feng-Long He, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 468 days.

(21) Appl. No.: 12/856,729

(22) Filed: Aug. 16, 2010

(65) Prior Publication Data
US 2011/0252246 A1 Oct. 13, 2011

(30) Foreign Application Priority Data

Apr. 9, 2010 (CN) .......................... 2010 1 0143787

(51) Int. Cl.
*G06F 1/00* (2006.01)
(52) U.S. Cl.
USPC .......................................................... 713/300
(58) Field of Classification Search
USPC .......................................................... 713/300
See application file for complete search history.

(56) References Cited

U.S. PATENT DOCUMENTS

| | | | | |
|---|---|---|---|---|
| 3,130,326 A * | 4/1964 | Habisohn | ...................... | 327/67 |
| 3,260,861 A * | 7/1966 | Dalley | ......................... | 377/110 |
| 3,437,831 A * | 4/1969 | Kirkpatrick et al. | .......... | 326/129 |
| 3,564,548 A * | 2/1971 | Grillot et al. | ................. | 342/423 |
| 3,746,981 A * | 7/1973 | Stone | ............................. | 340/653 |
| 3,793,485 A * | 2/1974 | Feezor et al. | .................. | 73/585 |
| 4,550,274 A * | 10/1985 | Weber | ........................ | 315/169.4 |
| 5,065,224 A * | 11/1991 | Fraser et al. | .................. | 257/666 |
| 5,077,490 A * | 12/1991 | Brown | ........................ | 326/110 |
| 5,519,348 A * | 5/1996 | Tanoi | ............................. | 327/205 |
| 6,154,845 A * | 11/2000 | Ilkbahar et al. | .............. | 713/300 |
| 6,256,682 B1 * | 7/2001 | Gudan et al. | .................... | 710/14 |
| 6,307,495 B1 * | 10/2001 | Mahant-Shetti et al. | ...... | 341/154 |
| 6,775,784 B1 * | 8/2004 | Park | ............................. | 713/320 |
| 6,816,935 B1 * | 11/2004 | Gulick | ......................... | 710/260 |
| 7,120,811 B1 * | 10/2006 | Bingi et al. | .................... | 713/324 |
| 7,402,962 B1 * | 7/2008 | Fong | ............................ | 315/299 |
| 7,469,353 B2 * | 12/2008 | Mundada et al. | ............. | 713/330 |
| 7,549,075 B2 * | 6/2009 | He et al. | ........................ | 713/600 |
| 7,565,564 B2 * | 7/2009 | Kuo et al. | ...................... | 713/500 |
| 7,698,583 B2 * | 4/2010 | Gaskins et al. | ............... | 713/300 |
| 7,779,191 B2 * | 8/2010 | Lu et al. | ........................ | 710/262 |
| 7,984,219 B2 * | 7/2011 | Nguyen et al. | ................ | 710/300 |
| 2007/0174649 A1 * | 7/2007 | Kuo et al. | ..................... | 713/500 |
| 2008/0151455 A1 * | 6/2008 | Ren | ................................. | 361/89 |
| 2008/0159562 A1 * | 7/2008 | Liu et al. | ...................... | 381/94.5 |

* cited by examiner

*Primary Examiner* — Paul R Myers
(74) *Attorney, Agent, or Firm* — Altis Law Group, Inc.

(57) ABSTRACT

A timing control circuit used to provide a timing control signal to a FSB power supply of a computer includes a first resistor, a second resistor, and a switch. The first resistor and the second resistor are connected in series between a power supply and ground. One end of the switch is connected to the computer and receives a state signal from the computer. Another end of the switch is connected a node between the first and second resistors and outputs a timing control signal according to the state signal.

14 Claims, 3 Drawing Sheets

TIMING CONTROL CIRCUIT AND POWER SUPPLY USING THE SAME

BACKGROUND

1. Technical Field

The disclosure generally relates to timing control circuits, particularly to a timing control circuit for a CPU front side bus (FSB) power supply.

2. Description of Related Art

In a computer, FSB connects the processor to the north bridge. A fast FSB means higher processing speed, so it is necessary to provide a stable supply power for the FSB. Power supplies with conventional timing control circuits for FSB maybe not be suitable for a large CPU load, such as quad-core CPU. Especially, when the computer is in an instant of being powered on or converting from a sleep state into a wake up state, the current output from the FSB power supplies may be pulled down by the large CPU load, therefore the computer may freeze or reset as a result.

Therefore, there is room for improvement within the art.

BRIEF DESCRIPTION OF THE DRAWINGS

Many aspects of the timing control circuit and power supply using the same can be better understood with reference to the following drawings. The components in the drawings are not necessarily drawn to scale, the emphasis instead being placed upon clearly illustrating the principles of the timing control circuit and power supply using the same.

DETAILED DESCRIPTION

Figure 1:
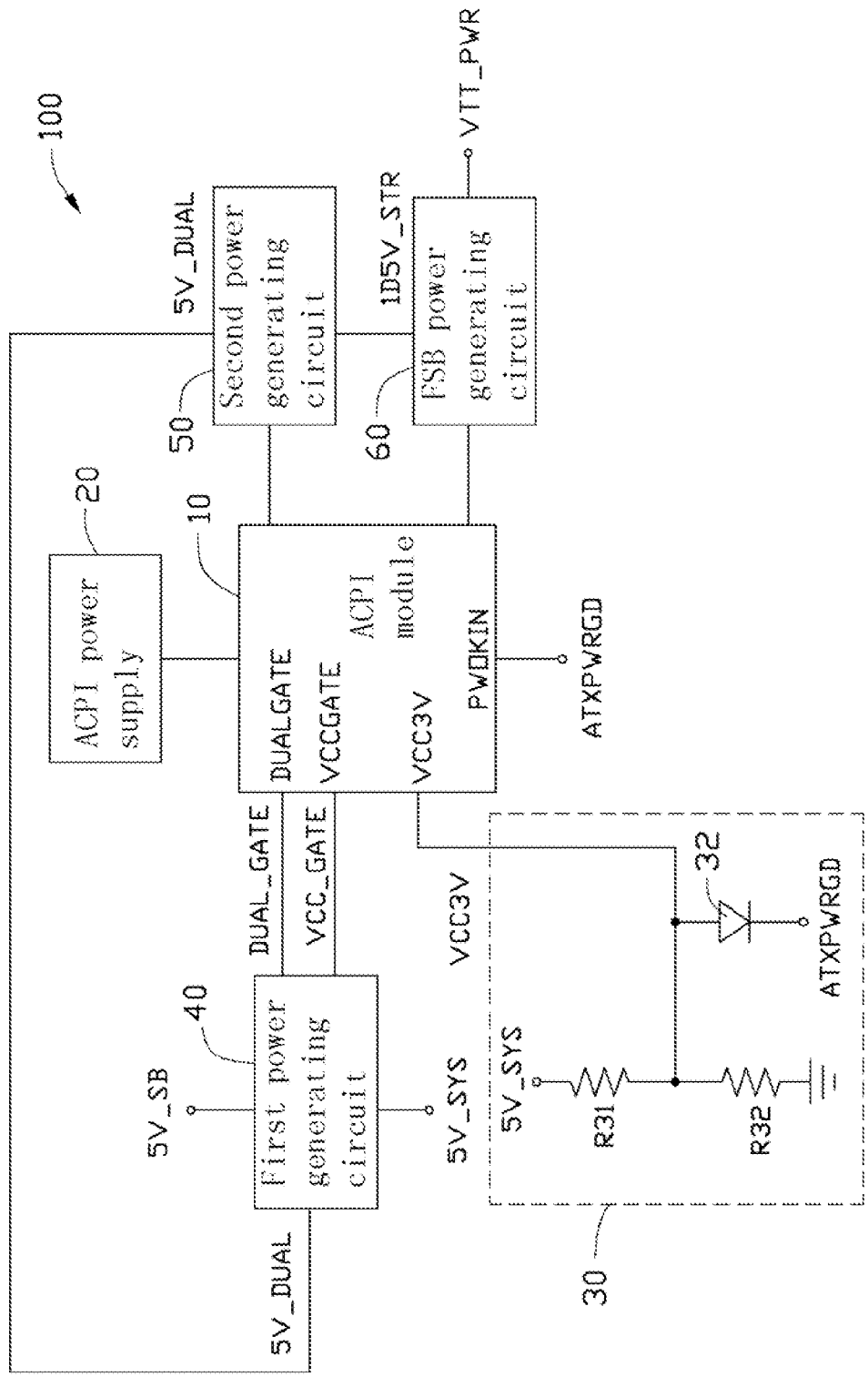
FIG. 1 is a block diagram of a timing control circuit and a power supply employed with the timing control circuit, according to an exemplary embodiment.

FIG. 1 shows a power supply 100 used in a computer, according to one exemplary embodiment. The power supply 100 includes an advanced configuration and power interface (ACPI) module 10, an ACPI power supply 20, a timing control circuit 30, a first power generating circuit 40, a second power generating circuit 50, and a FSB power generating circuit 60.

The ACPI module 10 may be an ACPI chip including a PWOKIN contact, a DUAL GATE contact, a VCC GATE contact and a VCC3V contact. The PWOKIN contact is connected to an input terminal ATXPWRGD of the computer to receive a state signal ATXPWRGD therefrom. When the computer is in a working state, the state signal ATXPWRGD is at a high level. When the computer is in a sleep or turned off state, the state signal ATXPWRGD is at a low level.

Figure 2:
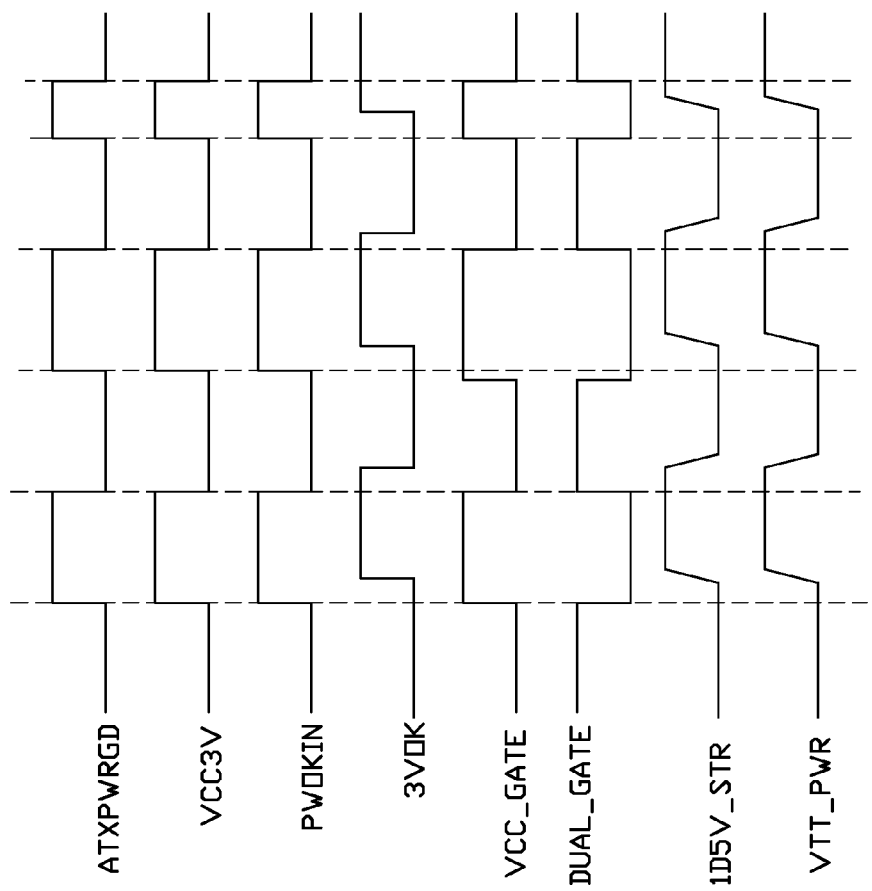
FIG. 2 is a timing chart illustrating major signals of FIG. 1.

The DUAL GATE contact and the VCC GATE contact are connected to the first power generating circuit 40 and respectively send a DUAL_GATE signal and a VCC_GATE signal to the first power generating circuit 40. Referring to FIG. 2, the DUAL_GATE signal and the VCC_GATE signal are determined by the state signal ATXPWRGD input into the PWOKIN contact. When the state signal ATXPWRGD is at the high level, the DUAL_GATE signal is at a low level, and the VCC GATE signal is at a high level. When the state signal ATXPWRGD is at the low level, the DUAL_GATE signal is at high level, and the VCC GATE signal is at low level.

The VCC3V contact is connected to the timing control circuit 30 to receive a timing control signal VCC3V from the timing control circuit 30. The ACPI module 10 is also connected to the second power generating circuit 50 and the FSB power generating circuit 60. When the timing control signal VCC3V is at a high level, such as more than 2.7V, the ACPI module 10 sends a 3VOK signal to control timings of the output of the second power generating circuit 50 and the FSB power generating circuit 60.

The timing control circuit 30 includes a first resistor R31, a second resistor R32, and a switch 32. The first resistor R31 and the second resistor R32 are connected in series between the power supply and ground. In this embodiment, the switch 32 is a diode. The anode of the diode is connected to a node between the first and second resistor R31 and R32 and the VCC3V contact of the ACPI module 10. The cathode of the diode is connected to the input terminal ATXPWRGD of the computer to receive the state signal ATXPWRGD. When the state signal ATXPWRGD is at the high level, the diode is turned off, the timing control signal VCC3V is at the high level. When the state signal ATXPWRGD is at the low level, the diode is turned on, the timing control signal VCC3V is at the low level.

The first power generating circuit 40 is connected to a standby power supply, such as a 5V standby power supply 5V_SB and a system power supply, such as a 5V system power supply 5V_SYS, and also connected to the ACPI module 10 and the second power generating circuit 50. The system power supply 5V_SYS is stable and not easily pulled down by a load. The first power generating circuit 40 selects the standby power supply 5V_SB or the system power supply 5V_SYS as an output power supply 5V_DUAL according to the states of the DUAL_GATE signal and the VCC_GATE signal. When the DUAL_GATE signal is at the high level and the VC_GATE signal is at the low level, that is the computer is in the working state, the first power generating circuit 40 selects the standby power supply 5V_SB as the output power supply 5V_DUAL. When the DUAL_GATE signal is at the low level and the VCC_GATE signal is at the high level, that is the computer is in the sleep or turned off state, the first power generating circuit 40 selects the system power supply 5V_SYS as the output power supply 5V_DUAL.

The second power generating circuit 50 is connected to the first power generating circuit 40 and the FSB power generating circuit 60. When the second power generating circuit 50 receives the 3VOK signal from the ACPI module 10, the second power generating circuit 50 receives the power supply 5V_DUAL from the first power generating circuit 40, and outputs a power supply 1D5V_STR to the FSB power generating circuit 60. The power supply 1D5V_STR can be also used to supply electrical power to other electrical members of the computer such as a random access memory (RAM).

The FSB power generating circuit 60 is connected to the ACPI module 10 and the second power generating circuit 50. When the FSB power generating circuit 60 receives the 3VOK signal from the ACPI module 10, the FSB power generating circuit 60 receives power supply 1D5V_STR from the second power generating circuit 50, and outputs a power supply VTT_PWR for the FSB (not shown).

When the computer is in the sleep or turned off state, the state signal ATXPWRGD is at the low level, the timing control signal VCC3V is also at the low level. The first power generating circuit 40 selects the standby power supply 5V_SB as the output power supply 5V_DUAL. In addition, the second power generating circuit 60 stops outputting the power supply 1D5V_STR to the FSB power generating circuit 60. The FSB power generating circuit 60 stops outputting the power supply VTT_PWR.

When the computer is in the working state, the state signal ATXPWRGD is at the high level, and the timing control signal VCC3V is at the high level. The first power generating circuit 40 selects the system power supply 5V_SYS as the output power supply 5V_DUAL. The ACPI module 10 outputs the 3VOK signal to the second power generating circuit 50 and the FSB power generating circuit 60. At the same time, the second power generating circuit 50 outputs a power supply 1D5V_STR to the FSB power generating circuit 60. The FSB power generating circuit 60 receives the power supply 1D5V_STR from the second power generating circuit 50 and outputs the power supply VTT_PWR for the FSB.

Therefore, when the computer is in an instant of being powered on or from a sleep state into a wake up state, the FSB power supply 100 selects the system power supply 5V_SYS from the standby power supply 5V_SB as an input power supply to avoid the computer hanging or resetting for a large CPU load.

Figure 3:
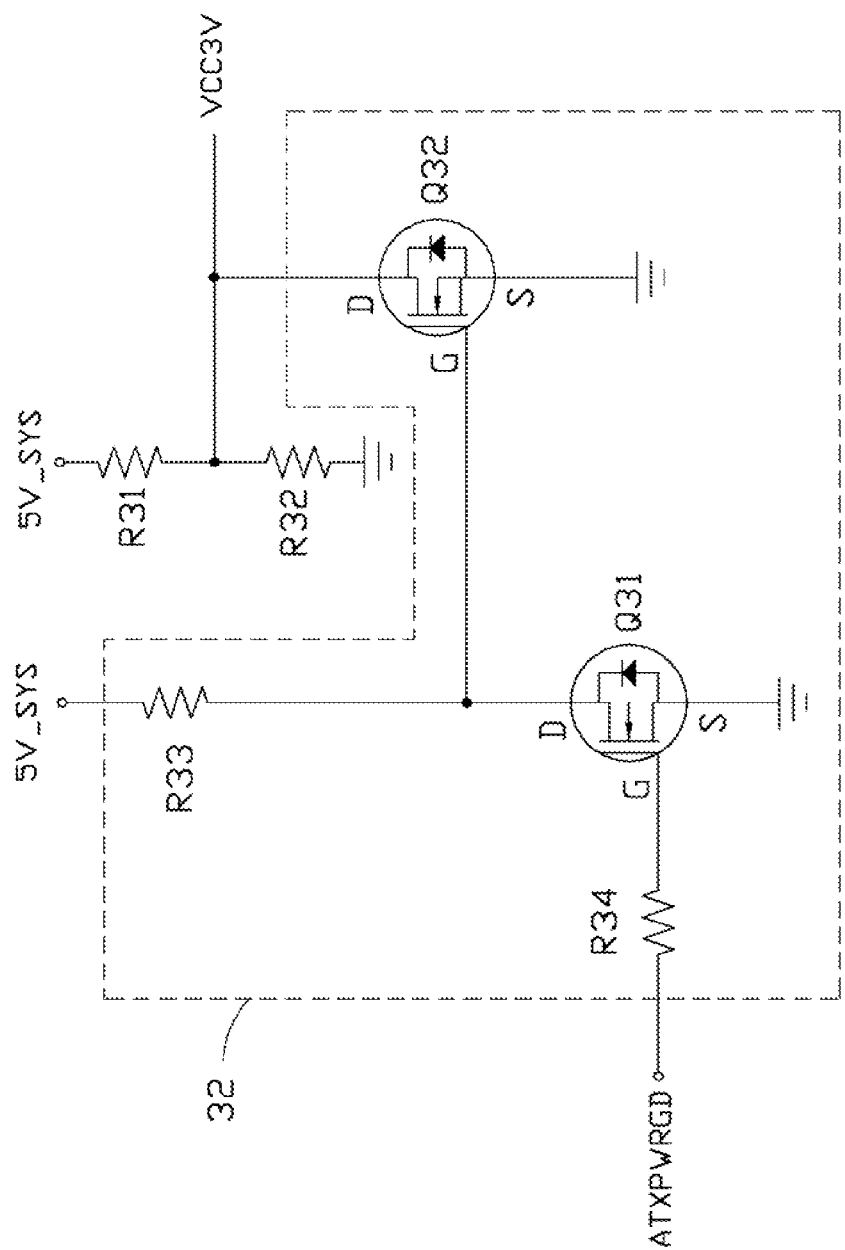
FIG. 3 is a circuit diagram of a timing control circuit, according to another exemplary embodiment.

Referring to FIG. 3, in another exemplary embodiment, the switch 32 of the timing control circuit 30 includes two resistors R33 and R34, a first transistor Q31 and a second transistor Q32. In this embodiment, the first transistor Q31 and the second transistor Q32 are N type metal oxide semiconductor field effect transistors. The drain of the first transistor Q31 is connected to the system power supply 5V_SYS by the resistor R33. The source of the first transistor Q31 is grounded. The gain of the first transistor Q31 is connected to the input terminal ATXPWRGD by the resistor R34. The drain of the second transistor Q32 is connected to a node between the resistor R31 and the resistor R32, and the VCC3V contact of the ACPI module 10. The source of the second transistor Q32 is grounded. The gain of the second transistor Q32 is connected to the drain of the first transistor Q31. In other embodiments, the first transistor Q31 and the second transistor Q32 may be npn bipolar junction transistors.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A timing control circuit used to provide a timing control signal for a front-side bus (FSB) power supply of a computer; comprising:
   a first resistor;
   a second resistor; and
   a switch; wherein the first resistor and the second resistor are connected in series between a power supply and ground, one end of the switch is connected to the computer and receives a state signal from the computer, another end of the switch is connected to a node between the first and second resistors and outputs a timing control signal for the FSB power supply according to the state signal.

2. The timing control circuit as claimed in claim 1, wherein the switch is a diode, the cathode of the diode is connected to the computer and receives the state signal from the computer; the anode of the diode is connected to the node between the first and second resistors and outputs a timing control signal to the FSB power supply.

3. The timing control circuit as claimed in claim 1, wherein the switch includes two resistors, a first transistor and a second transistor, the drain of the first transistor is connected to the power supply by the resistor; the source of the first transistor is grounded; the gain of the first transistor is connected to the computer by one of the resistors; the drain of the second transistor is connected to a node between the two resistors, and outputs the timing control signal, the source of the second transistor is grounded, the gain of the second transistor is connected to the drain of the first transistor.

4. The timing control circuit as claimed in claim 3, wherein the first and second transistors are N type metal oxide semiconductor field effect transistors or npn bipolar junction transistors.

5. The timing control circuit as claimed in claim 1, wherein when the computer is in a working state, the state signal is at high level; when the computer is in a sleep or turned off state, the state signal is at a low level.

6. The timing control circuit as claimed in claim 5, wherein when the state signal is at the high level, the timing control signal is at a high level; when the state signal is at the low level, the timing control signal is at a low level.

7. A front-side bus (FSB) power supply used to provide electrical power to a FSB of a computer; comprising:
   an Advanced Configuration and Power Interface (APCI) module receiving a state signal of the computer;
   a timing control circuit; comprising:
   a first resistor and a second resistor connected in series between a power supply and ground; and
   a switch, wherein one end of the switch is connected to the computer and receives the state signal from the computer, another end of the switch is connected to a node between the first and second resistors and outputs a timing control signal to the APCI module according to the state signal;
   a first power generating circuit connected to the APCI module and a standby power supply and a system power supply of the computer, and selectively outputting the standby power supply or the system power supply according to the state signal received by the APCI module; and
   a FSB power generating circuit connected to the APCI module and the first power generating circuit and outputting a power supply to the FSB from the system power supply according to the timing control signal received by the APCI module.

8. The FSB power supply as claimed in claim 7, wherein the switch is a diode, the cathode of the diode is connected to the computer and receives the state signal from the computer; the anode of the diode is connected to the node between the first and second resistors and outputs a timing control signal to the FSB power supply.

9. The FSB power supply as claimed in claim 7, wherein the switch includes two resistors, a first transistor and a second transistor, drain of the first transistor is connected to the power supply by the resistor; the source of the first transistor is grounded; the gain of the first transistor is connected to the computer by one of the resistors; the drain of the second transistor is connected to a node between the two resistors, and outputs the timing control signal, the source of the second transistor is grounded, the gain of the second transistor is connected to the drain of the first transistor.

10. The FSB power supply as claimed in claim 7, wherein when the computer is in a working state, the state signal is at a high level; when the computer is in a sleep or turned off state, the state signal is at a low level.

11. The FSB power supply as claimed in claim 10, wherein when the state signal is at the high level, the timing control signal is at a high level; when the state signal is at the low level, the timing control signal is at a low level.

12. The FSB power supply as claimed in claim 11, wherein when the state signal is at the high level, the ACPI module controls the first power generating circuit to output the system power supply; when the state signal is at the low level, the ACPI module controls the first power generating circuit to output the standby power supply.

13. The FSB power supply as claimed in claim 7, further comprising a second power generating circuit positioned between the first power generating circuit and the FSB power generating circuit.

14. The FSB power supply as claimed in claim 13, wherein the second power generating circuit supplies electrical power to a RAM of the computer.

* * * * *